United States Patent [19]

Dietze

[11] Patent Number: 5,058,156
[45] Date of Patent: Oct. 15, 1991

[54] NETWORK INTERFACE AND COMMUNICATION TERMINAL

[75] Inventor: Wolfgang Dietze, Korntal, Fed. Rep. of Germany

[73] Assignee: Standard Electrik Lorenz AG, Stuttgart, Fed. Rep. of Germany

[21] Appl. No.: 405,345

[22] Filed: Sep. 11, 1989

[30] Foreign Application Priority Data

Sep. 14, 1988 [DE] Fed. Rep. of Germany ....... 3831215

[51] Int. Cl.⁵ .............................................. H04L 9/00
[52] U.S. Cl. ....................................... 380/9; 380/49; 370/84
[58] Field of Search ........................ 370/24, 31, 68, 79, 370/84, 101, 109, 111; 375/112; 364/200, 900

[56] References Cited

U.S. PATENT DOCUMENTS

| | | | |
|---|---|---|---|
| 4,017,688 | 4/1977 | Callens et al. | 370/84 |
| 4,330,689 | 5/1298 | Kang et al. | 380/9 X |
| 4,484,327 | 11/1984 | Hanson | 370/84 |
| 4,538,286 | 8/1985 | McNesby et al. | 370/84 X |
| 4,641,303 | 2/1987 | Vogl | 370/84 |
| 4,698,801 | 10/1987 | Hatano et al. | 370/60 |
| 4,716,561 | 12/1987 | Angell et al. | 370/84 X |

FOREIGN PATENT DOCUMENTS 3033871 11/1982 Fed. Rep. of Germany .

Primary Examiner—Bernarr E. Gregory
Attorney, Agent, or Firm—Christie, Parker & Hale

[57] ABSTRACT

According to the invention, for connections between terminals connected to different networks, the terminals intended for connection to the network having the higher capacity are so equipped that, alternatively (I, II), they could also operate at the network having the lower capacity. In these terminals as well as at the interface between the two networks, simple network interface devices (30, 60) are inserted which insert and extract the filler bits in a suitable manner.

3 Claims, 1 Drawing Sheet

NETWORK INTERFACE AND COMMUNICATION TERMINAL

TECHNICAL FIELD

The present invention relates to a network interface for use between two digital telecommunication networks with transmission channels of different capacity and, thus, different bit rate, particularly 64-kb/s and 16-kb/s telecommunication networks, and to communication terminals, particularly telephone terminals, which are designed for connection to that of the two telecommunication networks having the transmission channels of higher capacity.

CLAIM FOR PRIORITY

This application is based on and claims priority from an application first filed in Fed. Rep. Germany on Sept. 14, 1988 under Ser. No. 38 31 215.8. To the extent such prior application may contain any additional information that might be of any assistance in the use and understanding of the invention claimed herein, it is hereby incorporated by reference.

BACKGROUND ART

To meet different requirements, telecommunication networks with different types of modulation and different transmission rates are used.

For stationary telecommunication networks, such as those of European postal administrations, the CCITT recommendations are generally applied, i.e., in Europe, a channel bit rate of 64 kb/s and pulse-code modulation with A-law companding.

For economic reasons, other stationary telecommunication networks are also implemented in accordance with those CCITT recommendations. This applies in particular with regard to the introduction of ISDN for subscribers in such telecommunication networks. Besides the stationary telecommunication networks, however, there are also tactical telecommunication networks. The latter are characterized by great mobility of the subscribers and possible strong interference on the transmission links. Therefore, a channel bit rate of 16 kb/s or 32 kb/s and other modulation types, e.g., delta modulation in different variants, have been established for tactical telecommunication networks. The same applies analogously to the new civil mobile radio network (C-net), which is currently being introduced.

The different channel bit rates and types of modulation cause problems during connections between subscriber facilities of different telecommunication networks, particularly if the speech or data is to be transmitted in encrypted form. In either case, it is not possible to simply convert the signals from one channel bit rate and type of modulation to another and back.

In general, encryption and decryption in a connection between two telecommunication networks can be accomplished by performing a single-channel encryption in each of the two telecommunication networks and a code conversion (transcoding) at the interface between the different telecommunication networks.

One of the disadvantages of this solution is that it does not permit end-to-end encryption, since at the interface between the two different telecommunication networks, the information must be present in plain text so that a code conversion can be performed.

If the code conversion takes place at the exchange, stringent requirements must be placed on crosstalk attenuation between the individual connections which can be met only with great difficulty, if at all. These requirements are reduced if the code conversion is performed in a special facility.

DISCLOSURE OF INVENTION

It is an object of the invention to provide a network interface and an application thereof which provides a connection between two networks that poses no such problems.

According to the invention, for connections between terminals connected to different networks, the terminals intended for connection to the network having the higher capacity are so equipped that, alternatively, they could also operate at the network having the lower capacity. In these terminals as well as at the interface between the two networks, simple network interface devices are inserted which insert and extract the filler bits in a suitable manner.

Unlike the aforementioned variants, the proposed solution permits both end-to-end encryption and data transmission, with no particularly stringent requirements being placed on crosstalk attenuation and only two single-channel encryption and decryption devices having to be used in a connection.

The proposed solution eliminates the need to transcode the modulation types; instead, telecommunication network A must include an encoding facility both for modulation type A, e.g., PCM, and for modulation type B, e.g., delta modulation. Single-channel encryption and decryption devices can be inserted both into a 16-kb/s connection and into a 64-kb/s connection, as will be shown later.

BRIEF DESCRIPTION OF DRAWINGS

The invention will now be explained in more detail with reference to an embodiment thereof shown in the accompanying drawing.

The drawing shows a telephone terminal with devices for pulse-code modulation at 64 kb/s, devices for delta modulation at 16 kb/s, encryption and decryption devices, a network interface, and changeover facilities.

BEST MODE FOR CARRYING OUT THE INVENTION

Figure 1:
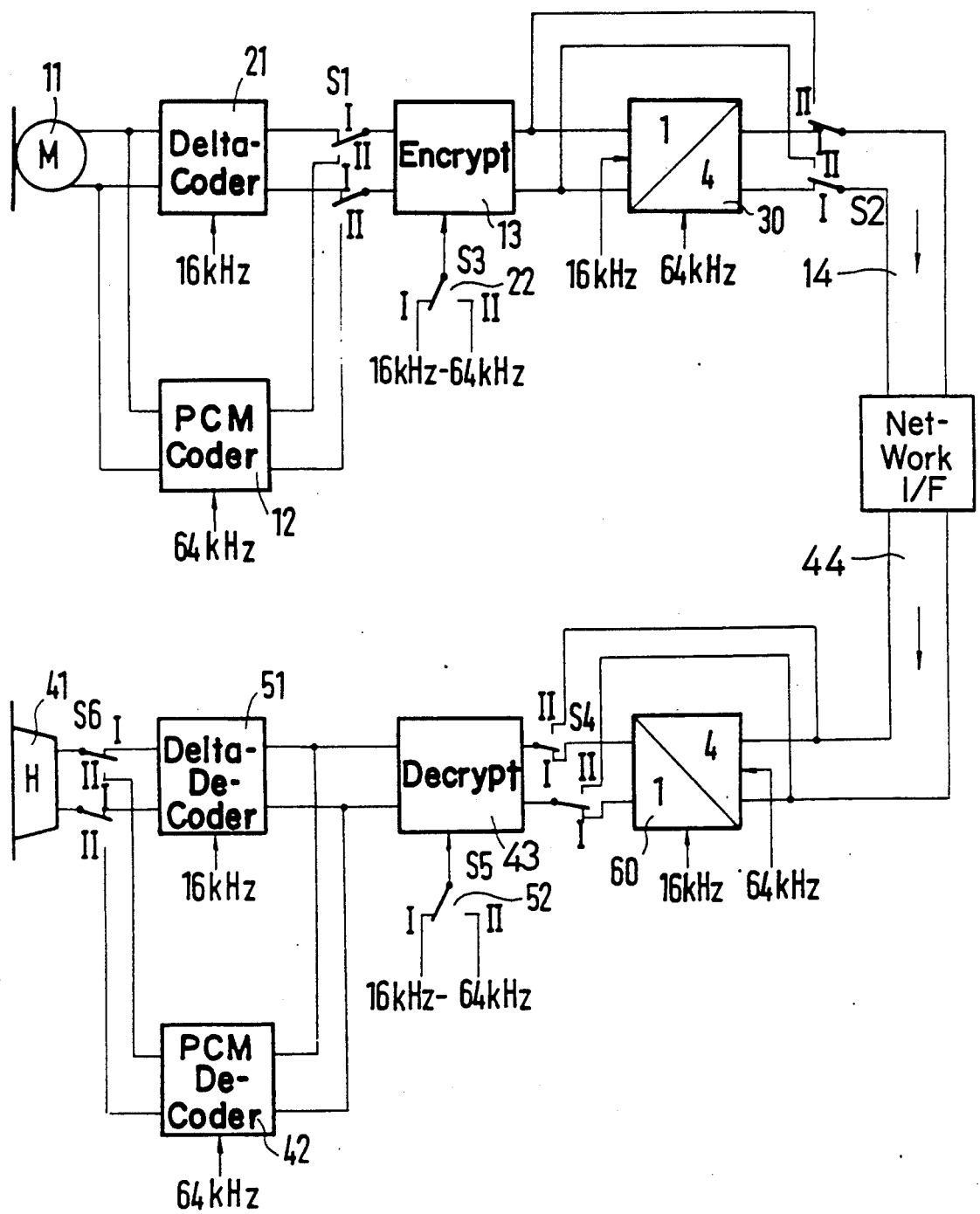

For connection to the 64-kb/s telecommunication network, the telephone terminal has, on the send side, a microphone 11 (M), a PCM encoder 12, and an encryption device 13 ($Z_S$), which are connected to the line 14, and, on the receive side, a receiver 41 (H), a PCM decoder 42, and a decryption device 43, which are connected to the line 44. The PCM encoder 12 and the PCM decoder 42 convert analog signals to digital signals and back and perform the necessary companding. The digital devices operate at a 64-kHz clock rate.

The transmission equipment via which the lines 14 and 44 are connected to the central-office trunks, e.g., line coder, power feeding equipment, and 2- to 4-wire converter, is not shown.

For connection to a 16-kb/s telecommunication network, the telephone terminal additionally includes, on the send side, a 16-kHz delta encoder 21, and a changeover device 22 for clocking the encryption device 13 at 16 kHz instead of 64 kHz and, on the receive side, a 16-kHz delta decoder 51 and a changeover device 52 for clocking the decryption device 43 at 16 kHz instead of 64 kHz.

The telephone terminal further includes a network interface consisting of a send-side portion 30 and a receive-side portion 60. This network interface makes it possible to operate the telephone terminal as a 16-kb/s terminal in connection with another 16-kb/s terminal although there is only a connection to the 16-kb/s network.

Via switches S1 to S6, the terminal is switched between the two modes. In the figure, all switches are shown in position I, which permits a connection with a remote 16 kb/s station. In position II (not shown), a connection with a remote 64-kb/s station is possible.

The send-side portion 30 of the network interface accepts the incoming useful bits at a 16-kHz clock rate and passes them on at a 64-kHz clock rate. The filler bits must be inserted inbetween. In the above numerical example, three filler bits are required for each useful bit. The spacing of the useful bits remains unchanged, however.

In the simplest case, the filler bits have the same value as the respective useful bits preceding them. This can be implemented, for example, by writing into a buffer at a 16-kHz clock rate and reading therefrom at a 64-kHz clock rate, with each bit being read four times in succession. The two clock signals need not be in synchronism.

Another possibility is to use 4-bit parallel-to-serial converters, which are preferably implemented with shift registers. Each incoming useful bit is supplied to all four inputs in parallel and is thus output four times in succession. It is also possible to feed the useful bits only to the first and third inputs and to either connect the two other inputs to a fixed potential or apply the useful bits to them in inverted form. In this manner, as frequent a change of state as possible is achieved, which is often desirable. The useful bits, i.e., the respective first bits of the fourbit groups, can still be unambiguously evaluated.

The receive-side portion 60 of the network interface operates conversely. Every fourth bit is extracted from the incoming 64-kb/s data stream and is passed on in a 16-kb/s data stream. If the filler bits have the same value as the respective preceding useful bits, it is not even necessary to see to it that the first bit of each four bitgroup is passed on.

This can again be implemented with a buffer from which only one of every four successively written bits is read, or with a 4-bit serial-to-parallel converter having only one of its four outputs wired.

While the realization using parallel-to-serial and serial-to-parallel converters is suitable only if the higher transmission rate is an integral multiple of the lower transmission rate, the realization using buffers into which data is written at one clock rate and from which data is read at another clock rate is applicable to arbitrary ratios of the transmission rates.

From the foregoing it follows that switching of the telephone terminals from one mode to the other is necessary only in the telecommunication network with the high transmission rate. The switching can be effected manually by the subscriber or automatically.

Automatic switchover can be effected by arranging that the equipment of the exchange of the a-subscriber in the 64-kb/s telecommunication network recognizes from the dialled destination address whether a changeover is necessary, and, if so, initiates a corresponding instruction to the devices in the terminal of the a-subscriber.

Switchover can also be effected by sending a backward signal from the equipment in the network of of the called subscriber to the devices in the terminal of the calling subscriber after establishment of a connection, thus causing a changeover.

When a connection is established from the b-subscriber in the 16-kb/s telecommunication network to the a-subscriber, a forward signal is sent from the equipment in the network of the b-subscriber to the terminal of the a-subscriber, thus causing a changeover.

The equipment of the exchange of the a-subscriber recognizes from the source address whether changeover is necessary, and, if so, initiates a corresponding instruction to the terminal of the a-subscriber.

The switching signal can also be used to switch the power supplies of the individual pieces of equipment so as to reduce power consumption, for example.

The signalling required to switch between the two modes can be in-band signalling, since it takes place in the connection setup phase, but it can also be accomplished over a separate service channel (D channel in ISDN).

What is claimed is:

1. A terminal, for encrypted digital communication, the terminal comprising:
   an encryption device;
   a decryption device;
   a network interface for changing an incoming digital transmission from a first bit rate to a second bit rate lower than said first bit rate and for changing an outgoing digital transmission from said second bit rate to said first bit rate;
   first means for directly connecting the encryption and decryption devices to a digital communication channel having a predetermined first capacity and a bit rate equal to said first bit rate and for operating said encryption and decryption devices at said first bit rate;
   second means for indirectly connecting said devices to said digital communication channel via said network interface so as to produce a terminal output that is also compatible with a second capacity and bit rate less than the first capacity and bit rate and for operating said encryption and decryption devices at said second bit rate; and
   switch means for alternating control between said first means and said second means.

2. A telephone terminal for encrypted voice communication, the terminal comprising:
   an encoder of a first type;
   an encryption device;
   a decoder of the first type;
   a decryption device;
   first means for connecting the encoder of the first type via the encryption device and for connecting the decoder of the first type via the decryption device to a digital telecommunication channel having a predetermined first capacity and bit rate, wherein the encoder and decoder of the first type convert analog signals to digital signals and back at the first bit rate, with the encryption and decryption devices operating at a first clock rate corresponding to the bit rate in a first telecommunication network;
   an encoder of a second type;

a decoder of a second type;

a network interface having an incoming portion for changing an incoming digital transmission from said first bit rate to a second bit rate lower than said first bit rate and an output portion for changing an outgoing digital transmission from said second bit rate to said first bit rate;

second means for connecting the encoder of the second type via the encryption device and via the output portion of the network interface and for connecting the decoder of the second type via the decryption device and via the input portion of the network interface to said digital telecommunication channel having said predetermined first capacity and bit rate, wherein the encoder and decoder of the second type convert analog signals to digital signals and back at a second bit rate less than the first capacity and bit rate, with the encryption and decryption devices operating at a second clock rate corresponding to the second bit rate; and means for switching the encryption and decryption devices between said first and second clock rates.

3. The telephone terminal of claim 2, wherein said first type is pulse-code-modulation, and said second type is delta modulation.

* * * * *